Patented Sept. 23, 1941

2,256,839

UNITED STATES PATENT OFFICE 2,256,839

1,1-DICHLORO-1-NITRO-PARRAFINS AND PROCESS OF MAKING THEM

Henry B. Hass, La Fayette, Ind., and Barney R. Strickland, Elizabeth, N. J., assignors to Purdue Research Foundation, La Fayette, Ind., a corporation of Indiana No Drawing. Application November 25, 1938, Serial No. 242,412

8 Claims. (Cl. 260—644)

Our invention relates to the chlorination of monochloronitroparaffins. More particularly, it relates to the production of 1,1-dichloro-1-nitroparaffins having more than one carbon atom.

In the past, chloronitroparaffins have been obtained by treating nitroparaffins having more than one carbon atom or the alkali or alkaline earth metal salts thereof with chlorine, hypochlorous acid or hypochlorites. From these operations, however, only the monochloronitroparaffins have been obtained.

We have now discovered that in the case of the primary nitroparaffins having in excess of one carbon atom it is possible to replace with chlorine atoms both of the hydrogen atoms attached to the carbon atom holding the nitro group. Our process comprises essentially: first producing the monochloronitroparaffin by any convenient means, but preferably by chlorinating a salt such as the alkali or alkaline earth metal salt of a nitroparaffin; next converting the monochloronitroparaffin into the corresponding alkali, alkaline earth metal, or other salt, whereby the alkali, alkaline earth, or other metal, replaces the hydrogen atom on the carbon atom now having attached to it both a chlorine atom and a nitro group; and finally chlorinating the resulting metal salt of the monochloronitroparaffin to produce the corresponding 1,1-dichloro-1-nitroparaffin, which may be recovered in any convenient manner.

In carrying out our process we add to the 1-chloro-1-nitroparaffin an alkaline solution, e. g., an aqueous solution of an alkali or alkaline earth metal hydroxide, preferably containing the amount of metal hydroxide theoretically required to give the corresponding salt of the 1-chloro-1-nitroparaffin. Preferably, sufficient solvent is supplied, either in the form of water in the metal hydroxide solution, or otherwise, to maintain the reaction mixture in liquid phase. Chlorine in at least the theoretical amount required for the reaction is then bubbled through the resulting reaction mixture, and the oil layer thereby formed is preferably recovered by washing, drying and fractional distillation. Both of the reactions involved in this process are exothermic in nature, and since the alkali metal salts of the chloronitroparaffins are unstable at high temperatures, lowered yields may result unless the heat of reaction is dissipated at a sufficiently high rate. For this reason we prefer to employ external cooling, both for the formation of the salt of the 1-chloro-1-nitroparaffin and for the chlorination of this salt. In both cases the reaction temperature may suitably be maintained below 40° C., and preferably below 30° C.

Our procedure may be further illustrated by the following example:

Example

The sodium salt of 1-chloro-1-nitrobutane was prepared by reacting 171 parts by weight of 1-chloro-1-nitrobutane with 50 parts by weight of sodium hydroxide dissolved in 160 parts by weight of water. This reaction mixture was then treated with 89 parts by weight of chlorine, the latter being passed into the mixture at a rate of approximately 15 liters per hour while agitating and cooling to maintain the temperature of the mixture below 30° C. After completion of the reaction, the oil layer was separated, stirred vigorously with fresh concentrated sodium hydroxide solution, and finally with dilute sodium hydroxide solution. The oil layer was then washed with water and sodium thiosulfate solution, dried with calcium chloride and fractionally distilled. A 68% conversion of the 1-chloro-1-nitrobutane into 1,1-dichloro-1-nitrobutane was obtained. 1,1-dichloro-1-nitrobutane boils at 168.0° C. at 760 mm. pressure; its density at 25° C. is 1.3750; and its refractive index at 25° C. is 1.4483.

The procedure described above is applicable generally to the production of 1,1-dichloro-1-nitroparaffins having more than one carbon atom. Examples of other compounds of this type which have been produced by our new procedure are: 1,1-dichloro-1-nitroethane (boiling point 124.0° C. at 760 mm. pressure, density at 25° C. 1.4131 and refractive index at 25° C. 1.4423), 1,1-dichloro-1-nitropropane (boiling point 147.5° C. at 760 mm. pressure, density at 25° C. 1.3436 and refractive index at 25° C. 1.4472), and 1,1-dichloro-1-nitro-2-methylpropane (boiling point 166.3° C. at 760 mm. pressure, density at 25° C. 1.2902 and refractive index at 25° C. 1.4515).

Modifications of the procedure described may also be employed without departing from the scope of our invention. For example, other salts such as the calcium or other alkaline earth metal as well as alkali metal salts of the 1-chloro-1-nitroparaffin may be used as the starting material for the reaction. Also, different methods of recovering and refining the 1,1-dichloro-1-nitroparaffins may be used.

The 1,1-dichloro-1-nitroparaffins of our invention are obviously useful for the preparation of other organic compounds, and they have been found to be especially useful as anti-gel agents for rubber cements of the vulcanizing type.

Our invention now having been described, what we claim is:

1. In a process for the preparation of 1,1-dichloro-1-nitroparaffins, the step which comprises chlorinating a salt of a 1-chloro-1-nitroparaffin having more than one carbon atom.

2. In a process for the preparation of 1,1-dichloro-1-nitroparaffins, the step which comprises chlorinating an alkali metal salt of a 1-chloro-1-nitroparaffin having more than one carbon atom.

3. In a process for the preparation of 1,1-dichloro-1-nitroparaffins, the step which comprises chlorinating an alkaline earth metal salt of a 1-chloro-1-nitroparaffin having more than one carbon atom.

4. In a process for the preparation of 1,1-dichloro-1-nitroparaffins, the step which comprises chlorinating an aqueous solution of a salt of a 1-chloro-1-nitroparaffin having more than one carbon atom while maintaining the temperature of the reaction mixture below 40° C.

5. Dichloronitroparaffins having the following general formula:

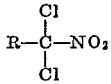

wherein R represents an alkyl radical.

6. 1,1-dichloro-1-nitroethane.
7. 1,1-dichloro-1-nitropropane.
8. 1,1-dichloro-1-nitrobutane.

HENRY B. HASS.
BARNEY R. STRICKLAND.